United States Patent [19]
Reinert et al.

[11] Patent Number: 5,833,277
[45] Date of Patent: Nov. 10, 1998

[54] TENSION-RESISTING PIPE CONNECTION AND METHOD OF MAKING SAME

[75] Inventors: Karl Albert Reinert; Frank Osenberg, both of Nordhorn; Manfred Vorbeck, Laufach; Horst Dahlemann, Aschafftenburg, all of Germany

[73] Assignee: Eisenwerke Fried. Wilh. Duker GmbH & Co. KG, Laufach, Germany

[21] Appl. No.: 495,970

[22] Filed: Jun. 28, 1995

[30] Foreign Application Priority Data

Jun. 28, 1994 [DE] Germany ............... 44 22 564.4
Aug. 31, 1994 [DE] Germany ............... 44 30 858.2
Jun. 1, 1995 [EP] European Pat. Off. ...... 95108375

[51] Int. Cl.$^6$ ................................................. F16L 21/06
[52] U.S. Cl. .................. 285/39; 285/343; 285/308; 285/323
[58] Field of Search ................... 285/39, 308, 322, 285/323, 343, 374, 377

[56] References Cited

U.S. PATENT DOCUMENTS

| | | |
|---|---|---|
| 2,635,901 | 4/1953 | Osborn . |
| 3,130,987 | 4/1964 | Johnson . |
| 4,643,466 | 2/1987 | Conner et al. ............... 285/374 X |
| 4,685,708 | 8/1987 | Conner . |
| 5,429,394 | 7/1995 | Olson ........................... 285/39 X |
| 5,520,419 | 5/1996 | DeBoalt et al. ............... 285/39 X |

FOREIGN PATENT DOCUMENTS

| | | |
|---|---|---|
| 0 113 527 | 7/1984 | European Pat. Off. . |
| 0 141 276 | 5/1985 | European Pat. Off. . |
| 0 579 194 | 1/1994 | European Pat. Off. . |
| 0 588 596 | 3/1994 | European Pat. Off. . |
| 37 36 587 | 10/1988 | Germany . |
| 40 02 057 | 2/1991 | Germany . |
| 389 342 | 7/1965 | Switzerland . |
| 1 464 743 | 2/1977 | United Kingdom . |

OTHER PUBLICATIONS

MIL–HDBK — 700 on Plastics pp. 35–41 (Nov. 1, 1965).

*Primary Examiner*—Randolph A. Reese
*Assistant Examiner*—Heather Shackelford
*Attorney, Agent, or Firm*—Herbert Dubno

[57] ABSTRACT

A pipe connection is formed between a relatively soft pipe segment and a stiffer socket by inserting a split securing ring in a groove of the socket, then spreading this ring and inserting the pipe segment through the split ring into the pipe segment without contact with the split ring. The mounting body maintaining the spread state of the split ring is then removed to allow the spring ring to engage with its intrinsic elastic force along the periphery of the pipe segment. Even if the inner surface of the split ring is provided with a corundum layer or like friction-enhancing structure there will be no damage to the outer periphery of the pipe which might interfere with sealing.

17 Claims, 14 Drawing Sheets

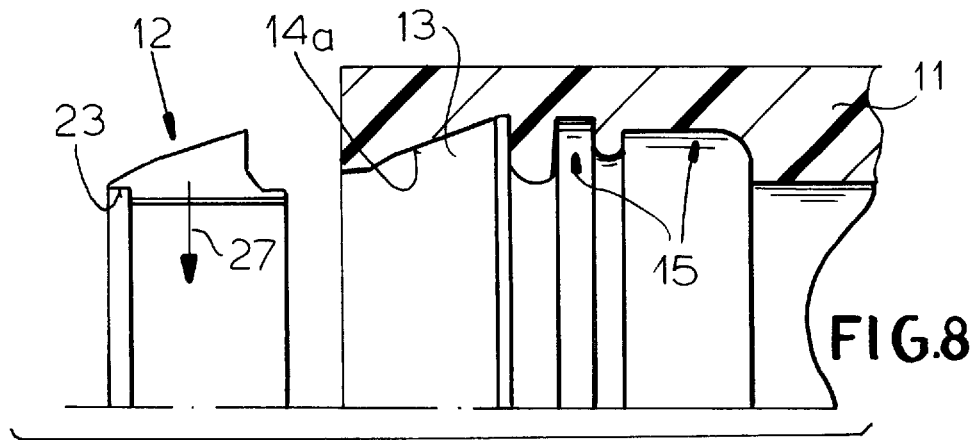
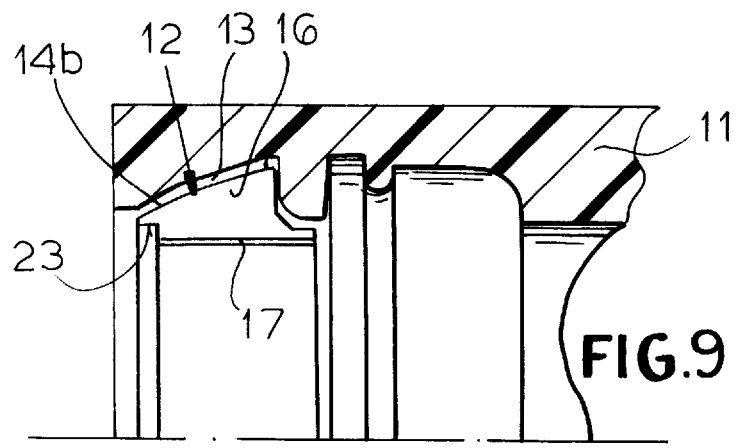
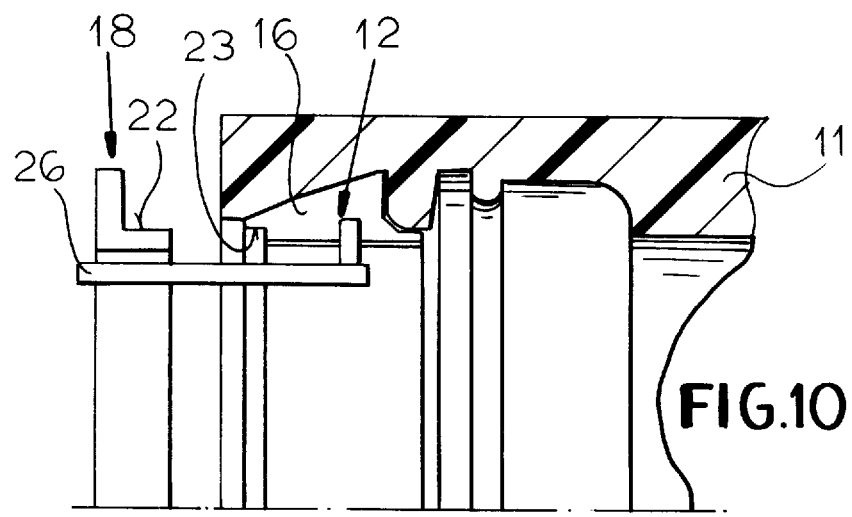

TENSION-RESISTING PIPE CONNECTION AND METHOD OF MAKING SAME

FIELD OF THE INVENTION

Our present invention relates to a tension-resisting pipe connection and to a method of making same.

BACKGROUND OF THE INVENTION

In German Patent document 37 36 587 A1, there is described a pipe connection which can be provided between a pipe segment composed of a relatively soft synthetic resin material, like polyvinylchloride, polyethylene, polypropylene or the like and a socket which can especially be of metal which utilizes a slit spreadable securing ring receivable in an inwardly open groove of the sleeve and which can be provided along its inner periphery with a friction-enhancing surface for engagement with the outer periphery of the pipe segment.

The groove and the securing ring have mutually-engageable flanks which converge toward the mouth of the socket and which wedge the securing ring toward the pipe segment when tension is applied, the securing ring gripping the pipe segment with its internally-directed intrinsic elastic force and inward force generated by axial tension on the pipe connection.

The securing ring in this construction has the configuration of a spring ring which is spread against the outer periphery of the pipe segment and thus serves to prevent separation of the pipe segment from the socket. When the pipe segment is an especially soft synthetic resin, however, its surface can be easily damaged by forcing it through the spring ring lined with the friction-enhancing material or forcing the spring ring over the pipe segment, thereby interfering with the sealing of the connection.

OBJECTS OF THE INVENTION

It is, therefore, the principal object of the present invention to provide an improved pipe connection of the aforedescribed general type, i.e. having a socket, securing ring and pipe segment, whereby the drawbacks of the earlier system are obviated, i.e. the potential damage to even soft pipe segments can be avoided.

Another object of this invention is to provide a pipe connection between a relatively rigid sleeve or socket and a relatively soft pipe segment which can ensure maintenance of an effective seal.

Another object of this invention is to simplify and facilitate the assembly of a pipe connection of the type described.

Still another object of this invention is to provide an improved method of assembling or making the improved pipe connection.

SUMMARY OF THE INVENTION

These objects and others which will become apparent hereinafter are attained, in accordance with the invention, in a pipe connection of the type described but wherein engagement surfaces are provided for a spreading tool which can widen the securing ring so that its internal diameter is in excess of the external diameter of the pipe segment and which can be inserted into the socket through the mouth thereof. The securing ring is additionally provided on an outwardly turned edge thereof with a seat engageable upon a removable mounting body for holding the securing ring in its widened position while the pipe segment is inserted into the securing ring in a contactless manner, i.e. without contact with the securing ring.

Upon insertion of the pipe segment to the axial extent desired within the socket and, of course, the securing ring, the mounting body can be removed to allow the securing ring, which can have an internal periphery with enhanced frictional characteristics, to engage the outer periphery of the pipe segment.

The provision of the securing ring as a spreadable clamping ring, i.e. a split ring which can be widened by the tool and held in its widened position when the securing ring is in the groove in the socket, greatly simplifies insertion of the pipe segment without the danger of damaging its outer periphery which may be required to engage seals in the socket.

It is especially important, in this respect, to ensure the insertion of the pipe segments through the securing ring without contact of the pipe segment therewith.

According to a feature of the invention, the mounting body is an auxiliary mounting ring which is formfittingly engageable with the securing ring and has an inner diameter D. which is greater than the outer diameter D, of the pipe segment. The securing ring can be turned on its side facing toward the mouth of the socket with an annular shoulder or recess which can serve to center it on the auxiliary mounting ring. The formfitting connection between the formfitting ring and the securing ring can be provided with indexing means for angularly indexing the two rings relative to one another in a predetermined angular position.

The securing ring can be extended beyond the groove in the socket axially along the pipe segment according to another feature of the invention and the auxiliary mounting ring itself may be split and thereby subdivided into at least two shanks or arc segments which may be joined together by one or more hinge joints. The hinge joints may be film-type hinges when the auxiliary mounting ring is formed in one piece with a weakened zone constituting the joint. Advantageously, in this case, the auxiliary mounting and/or the securing ring can be composed of a tough elastic synthetic resin-like polyamide.

The relatively steep inclination of the mutually-engageable conical flanks of the securing ring and the groove may not always provide the optimum translation of axial tension into radial force on the securing ring and hence by the securing ring on the pipe segment. In that case we can provide the securing ring with another ring in the respective groove or form the securing ring of inner and outer ring members which engage one another with contact surfaces having a reduced inclination or conicity, i.e. which are somewhat less sharply inclined than the flanks previously described. Preferably in the case in which the securing ring is formed as inner and outer ring members, they engage each other at two axially-spaced zones at which the frustoconical surfaces are provided. This can afford an optimum force transmission between the securing ring and the pipe to be held axially in the connection.

According to a feature of the invention, the outer ring member can also be split and held by the mounting body against the base for insertion of the pipe segment in the securing ring. The inner and outer ring members can complementarily fit together at the flanks to resist axial telescoping of the ring members relative to one another upon application of the tension. The flanks also can include mutually engaging shoulders on the ring members close to ends thereof proximal to the mouth of the socket.

In another feature of the invention, the body can form the tool and can be a peripherally-split spreader with an inner diameter ($D_{is}$) upon connection to the securing ring which is smaller than an outer diameter ($D_a$) of the pipe segment and smaller than an inner diameter ($D_{ix}$) of the securing ring whereby insertion of the pipe segment in the body expands the body and the securing ring to pass the pipe segment into the securing ring without contact therewith.

The tension-resisting pipe connection can thus comprise:

a pipe section of a relatively soft material;

a peripherally split securing ring surrounding the pipe section and at least indirectly frictionally engageable with an outer periphery thereof; and a socket of a relatively stiff material having a mouth receiving the pipe section and formed with an inwardly open groove accommodating the securing ring, at least one of the groove and the ring having a generally conical flank converging toward the mouth of the socket and wedging the ring toward the pipe section upon application of tension to the pipe connection tending to draw the pipe section out of the socket, the ring being dimensioned to have an intrinsic elastic force bearing inwardly so that a force with which the ring bears upon the pipe section is determined by the intrinsic elastic force and a compressive force determined by the tension, the ring being formed with engagement surfaces engageable by a spreading tool insertable through the mouth of the socket for spreading the ring into the groove, and the ring being formed on a side thereof turned toward the mouth with a seat engageable upon a removable mounting body for holding the ring in a spread condition enabling contactless insertion of the pipe section therethrough.

An assembly forming the tension-resisting pipe connection can thus comprise:

a pipe section of a relatively soft material selected from the group which consists of polyvinylchloride, polyethylene and polypropylene;

a peripherally split securing ring of polyamide surrounding the pipe section and at least indirectly frictionally engageable with an outer periphery thereof;

a socket of a relatively stiff material of synthetic resin or metal having a mouth receiving the pipe section and formed with an inwardly open groove accommodating the securing ring, at least one of the groove and the ring having a generally conical flank converging toward the mouth of the socket and wedging the ring toward the pipe section upon application of tension to the pipe connection tending to draw the pipe section out of the socket, the ring being dimensioned to have an intrinsic elastic force bearing inwardly so that a force with which the ring bears upon the pipe section is determined by the intrinsic elastic force and a compressive force determined by the tension;

a spreading tool for spreading the ring, the ring being formed with engagement surfaces engageable by the spreading tool insertable through the mouth of the socket for spreading the ring into the groove; and a removable mounting body, the ring being formed on a side thereof turned toward the mouth with a seat engageable with the removable mounting body for holding the ring in a spread condition enabling contactless insertion of the pipe section therethrough.

According to another aspect of the invention the method of making the connection can comprise:

(a) providing a socket of a relatively stiff material having a mouth receiving the pipe section and formed with an inwardly open groove;

(b) positioning a peripherally split securing ring in the groove, at least one of the groove and the ring having a generally conical flank converging toward the mouth of the socket for wedging the ring inwardly upon application of tension to the pipe connection;

(c) spreading the securing ring with a tool inserted through the mouth to increase a diameter of the securing ring and lodge the ring against the socket in an expanded position of the securing ring;

(d) holding the securing ring in the expanded position with an auxiliary mounting ring and removing the tool;

(e) inserting a pipe segment of relatively soft material into the mounting ring and contactlessly through the securing ring to a given position in the socket; and (f) removing the auxiliary mounting ring from the securing ring and from the pipe segment, thereby enabling the securing ring to frictionally close onto the pipe segment.

Alternatively the method can comprise:

(a) providing a socket of a relatively stiff material having a mouth receiving the pipe section and formed with an inwardly open groove;

(b) positioning a peripherally split securing ring in the groove, at least one of the groove and the ring having a generally conical flank converging toward the mouth of the socket for wedging the ring inwardly upon application of tension to the pipe connection;

(c) inserting a spreading body into the securing ring and spreading the body by inserting a pipe segment of relatively soft material axially therein to increase a diameter of the securing ring and lodge the ring against the socket in an expanded position of the securing ring; and (d) while holding the securing ring in the expanded position with the body, inserting a pipe segment of relatively soft material into the body and contactlessly through the body to a given position in the socket; and (e) removing the body from the securing ring and from the pipe segment, thereby enabling the securing ring to frictionally close onto the pipe segment.

BRIEF DESCRIPTION OF THE DRAWING

The above and other objects, features, and advantages will become more readily apparent from the following description, reference being made to the accompanying drawing in which:

FIG. 8–13 are diagrammatic illustrations in partial section illustrating the successive steps in the forming of the connection;

SPECIFIC DESCRIPTION

Figure 1A:
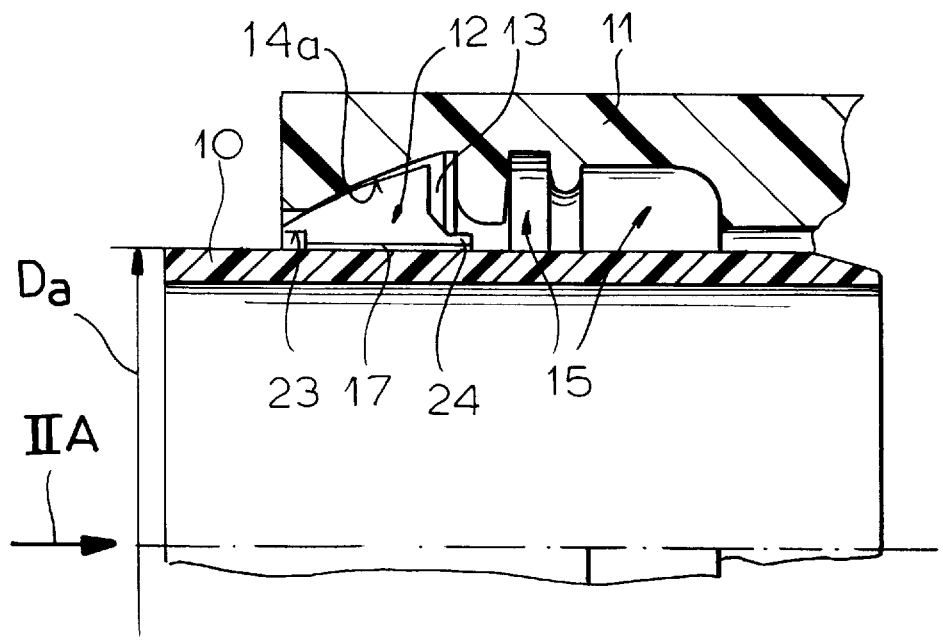
FIG. 1A is a partial axial section of a pipe connection according to the invention, omitting the seals, and illustrating the pipe segment fully in place.
Figure 1B:
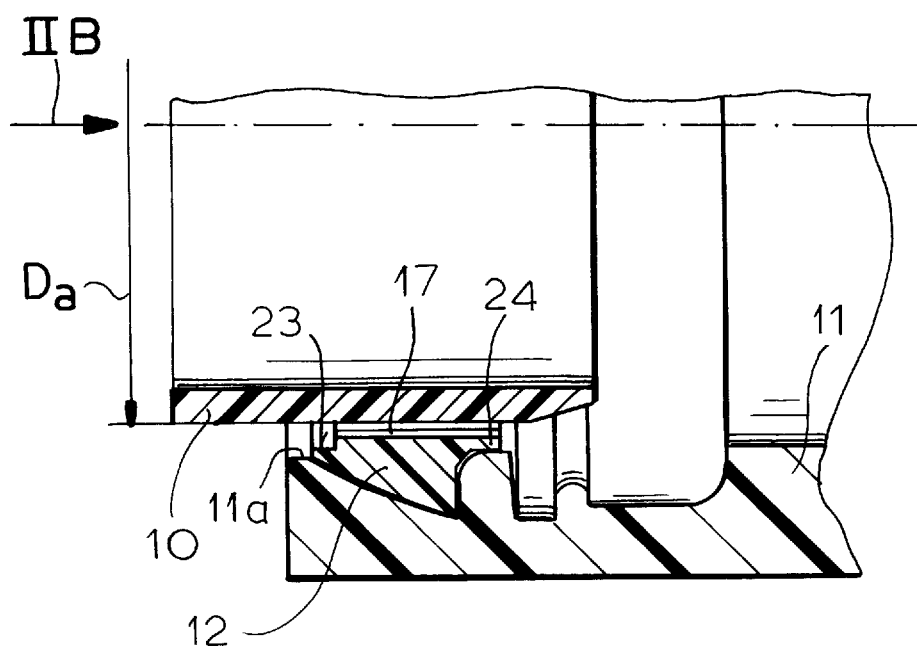
FIG. 1B is a view similar to FIG. 1A and omitting the mounting body, but illustrating the insertion of the pipe segment.
Figure 2A:
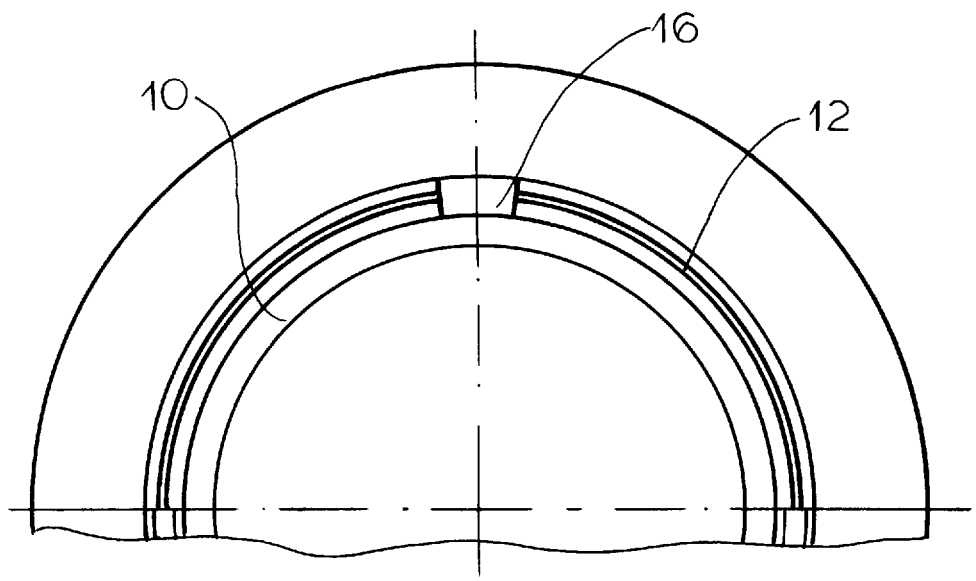
FIG. 2A is an end view in the direction of arrow II of the completed pipe connection.
Figure 2B:
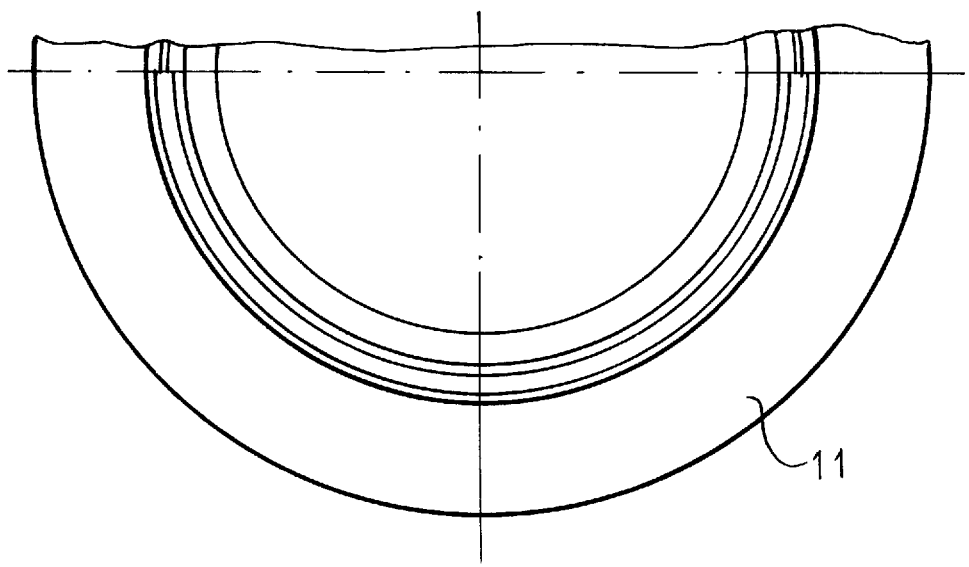
FIG. 2B is a view in the same direction corresponding to FIG. 1B.

FIGS. 1A and 1B and the related Figures illustrate a first embodiment of a pipe connection according to the invention which utilizes a pipe segment 10 of a relatively soft synthetic resin, for example, polyethylene, polypropylene, polyvinylchloride or the like, a pipe socket 11 of plastic or metal and which is more rigid than the pipe segment 10, and a securing ring 12 disposed between the pipe 10 and the socket 11. The pipe segment 10 can be the end of a long pipe, can be a section of pipe which can be attached by welding or adhesive bonding to a longer pipe or can be a fitting which can be attached in other ways to a length of pipe.

To receive the securing ring 12 which is preferably composed of tough elastic material such as a polyamide, the socket 11 has an inwardly open groove 13 which has a frustoconical or wedge-shaped cross section and, to that end, has a contact flank 14 which converges toward the pipe section 10 in the direction of the mouth 11a of the socket 11. Additional grooves 15 in the socket 11 serve to receive elastomeric seals or other sealing rings which can engage the outer periphery of the pipe section 10 to seal the pipe coupling.

Figure 4:
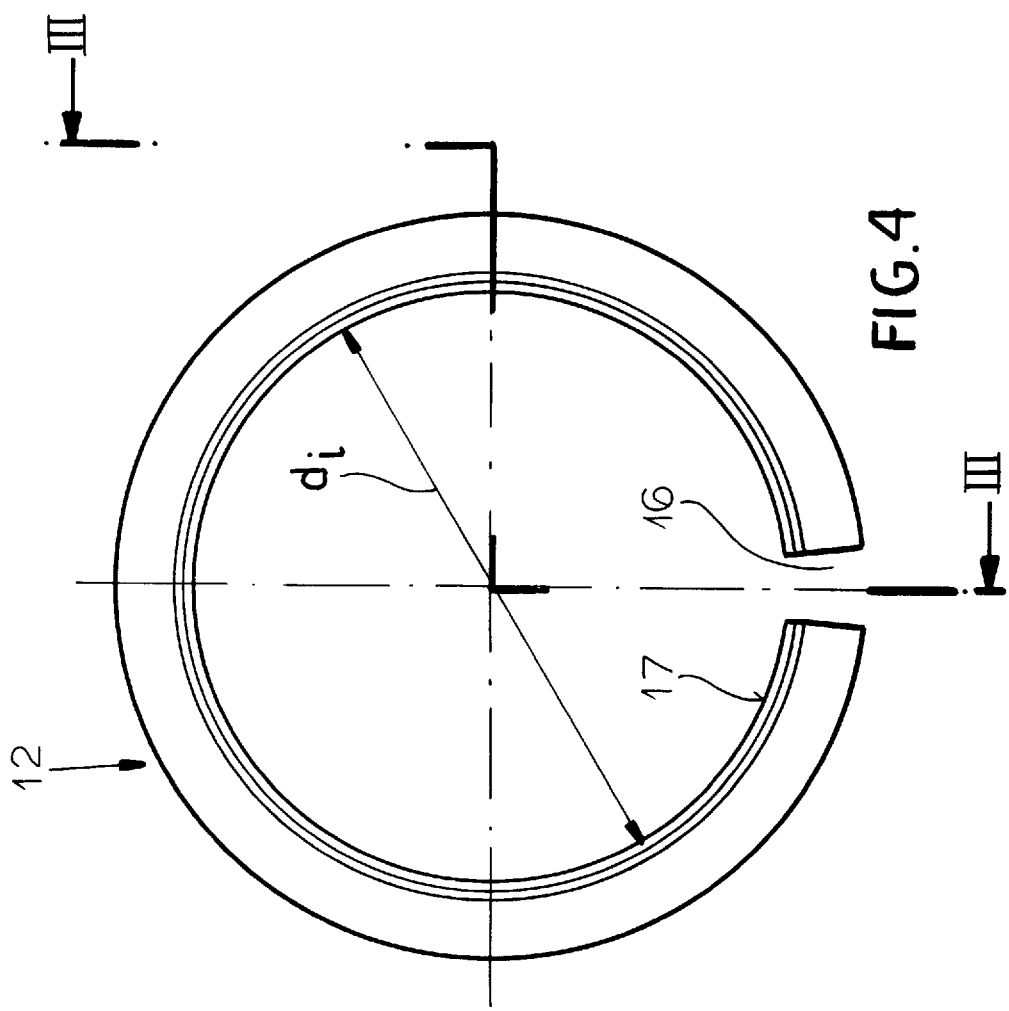
FIG. 4 is an end view of the securing ring.
Figure 3:
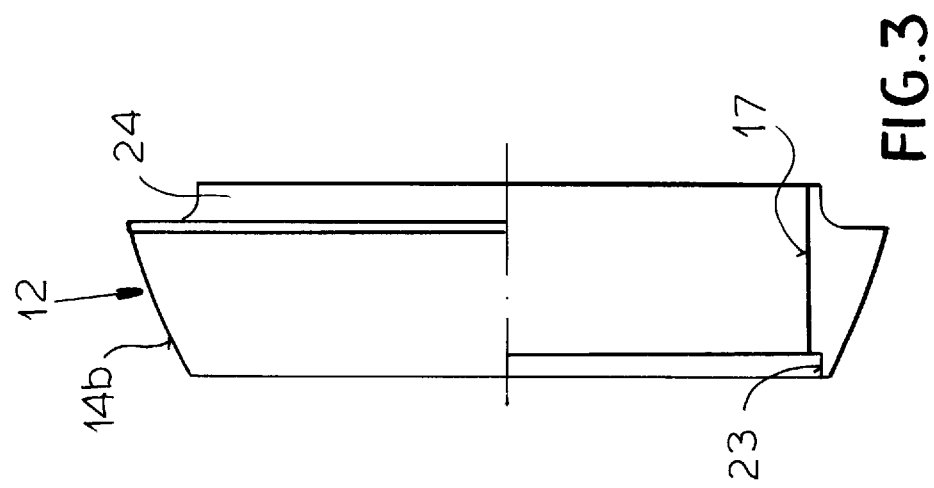
FIG. 3 is a view half in elevation and half in section along the line III—III of FIG. 4 of the securing ring used in the pipe connection in of FIGS. 1A and 1B.

The elastically deformable securing ring 12 has a slit 16 along its periphery and thus is constituted as a split ring or a spreadable clamping ring which can contract, after being spread, to an internal diameter no less than the outer diameter of the pipe section 10. The width of the slit 16 is at least sufficient to enable the ring 12 to be contracted peripherally by closing the slit 16 so that the outer diameter of the split ring 12 is reduced sufficiently to enable that ring to be inserted into the groove 13 from the mouth 11a of the socket 11. The inner diameter $d_i$ (FIG. 4) of the split ring 12 is significantly smaller than the outer diameter $D_a$ (FIG. 1) of the pipe segment 10, with which it is to cooperate, so that in the embodiment described the securing ring 12 can engage the outer periphery of the pipe section with intrinsic radial prestress.

Before the pipe segment 10 is inserted in the securing ring 12 within the socket 11, the securing ring 12 is enlarged in diameter as is shown in FIG. 1B. In this enlarged state, the pipe section can be inserted without contact with the securing ring 12 until it reaches its end position as illustrated in FIG. 1A. At that point, the securing ring 12 is allowed to contract against the periphery of the pipe 10 to apply the intrinsic radial clamping force thereto. On the inner periphery of the securing ring 12 a friction-increasing means 17, e.g. a layer of corundum, a tool pattern of projections, or an inlay can be provided as shown at 17. When attempts are made to draw the tube 10 and socket 11 axially apart, the inclined contact flanks 14a and 14b of the groove 13 and of the securing ring 12 engage one another and, with increasing axial tension, provide an increased clamping force by a wedging action of the securing ring 12 against the periphery of the pipe 10.

Advantageously, the engagement surface of the securing ring 12 against the pipe 10 is extended in the axial direction by providing a ring 12 with an extension 24 beyond the groove 13 (see FIGS. 1A and 1B).

Figure 6:
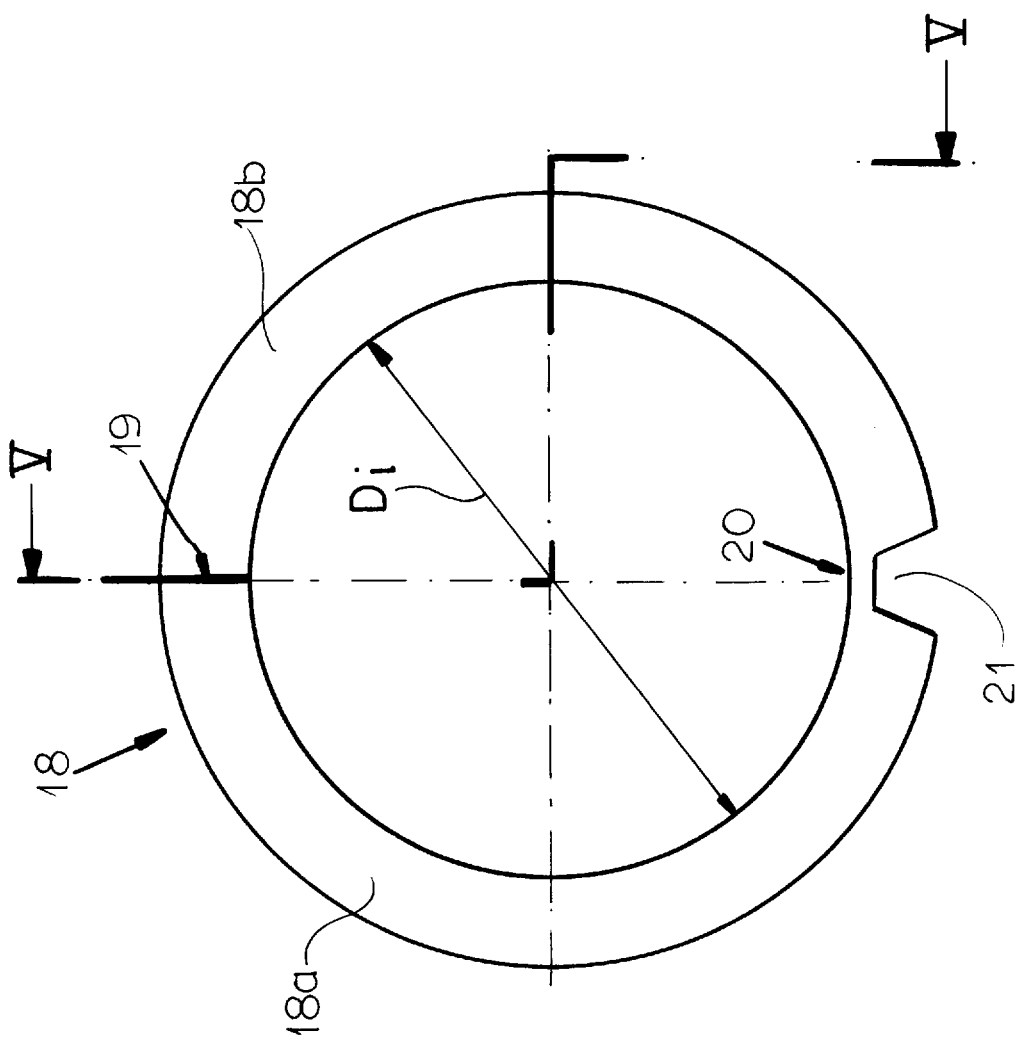
FIG. 6 is an elevational view of the auxiliary mounting ring.
Figure 5:
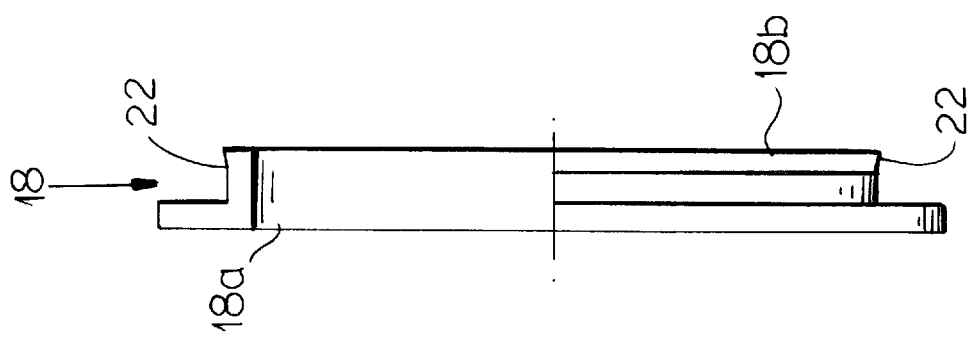
FIG. 5 is a view half in elevation and half in section along the line V—V of FIG. 6 of an auxiliary mounting forming the mounting body for the fabrication of the pipe connection of FIGS. 1A and 1B.

To facilitate assembly of the pipe coupling of FIGS. 1A, 1B, 2A, 2B, an auxiliary mounting ring 18 is provided to act as a mounting body (FIGS. 5 and 6) capable of retaining the securing ring 12 in its spread position. The body 18 is formed as a one-piece injection molded element of a tough elastic synthetic resin like, for example, a polyamide. The auxiliary mounting ring 18 is likewise provided with a slit 19 which has a function of subdividing the ring 18 into two parts 18a and 18b which can be held together by a hinge 20 formed by another portion of the periphery of the ring 18, so that the parts joined by the hinge can be swung about the hinge axis relative to one another enabling the ring 18 to be opened and reclosed.

In the embodiment illustrated, the hinge 20 is a pinless hinge formed unitarily with the shanks or segments of the ring 18 by a weakening or peripheral recess 21, whereby the hinge 20 functions similarly to a film hinge. It is important that the auxiliary mounting ring 18 be able to be opened by swinging its segments 18a and 18b apart to enable it to be radially spaced for the pipe 10 and radially withdrawn therefrom. The inner diameter $D_i$ of the ring 18 when its slit 19 is closed, at least slightly greater than the outer diameter $D_a$ of the pipe segment 10 so that the latter can be inserted through the auxiliary mounting ring without difficulty. For centering the securing ring 12 relative to the auxiliary mounting ring 18, a turned shoulder is provided at 22 on the mounting ring and can seat in the recess 23 turned in the securing ring 12.

Figure 7:
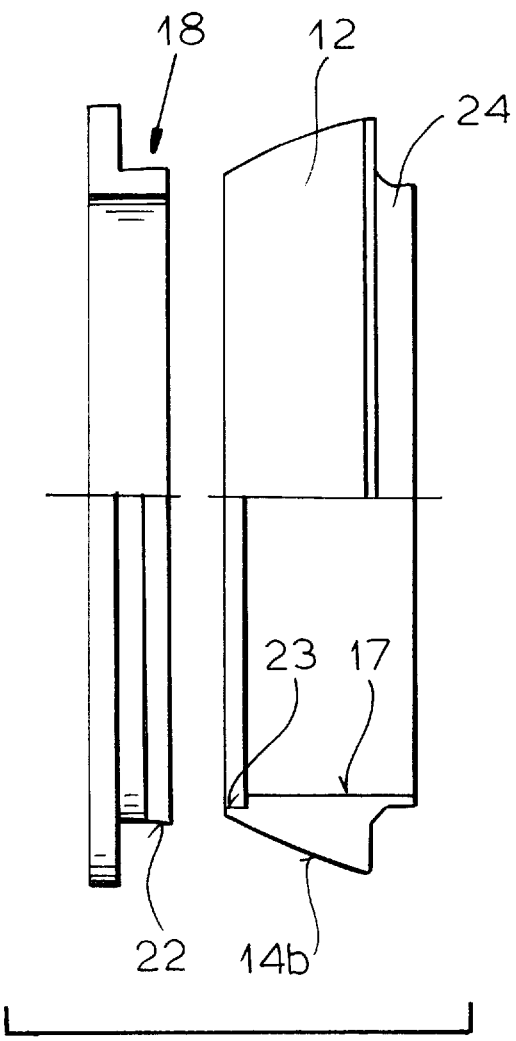
FIG. 7 is a view half in section and half in elevation showing the assembly of the mounting ring and the securing ring before the spreading of the securing ring.
Figure 7A:
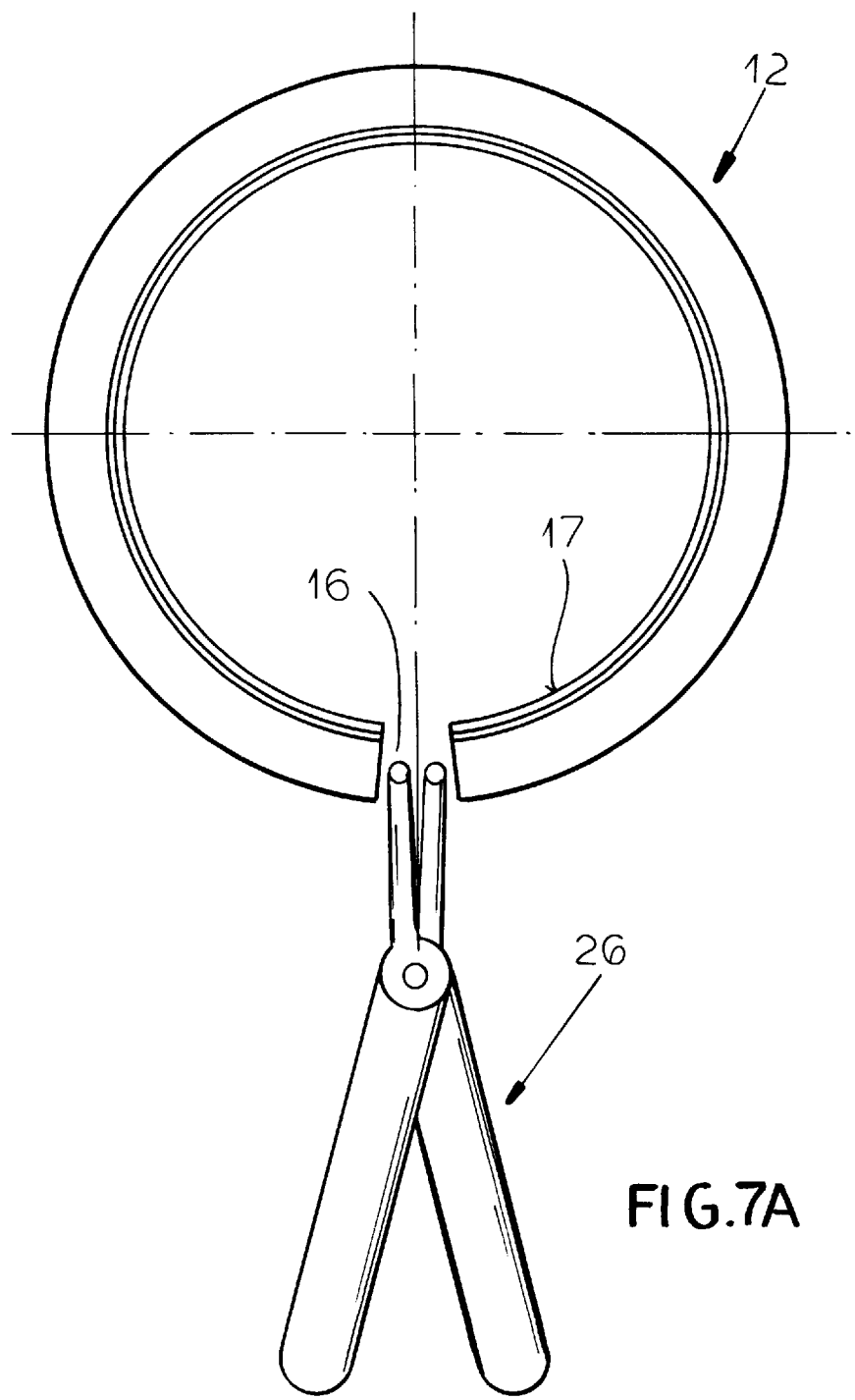
FIG. 7A is an elevational view illustrating the spreading step.
Figure 11:
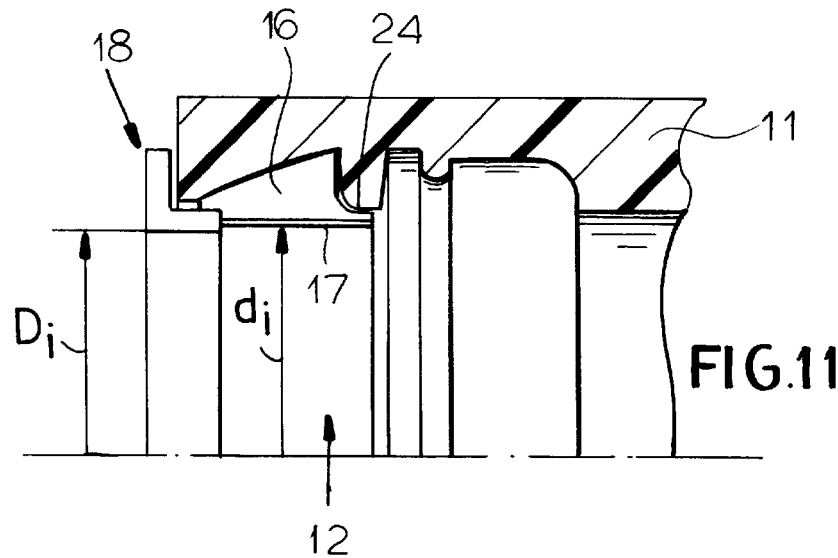
Figure 12:
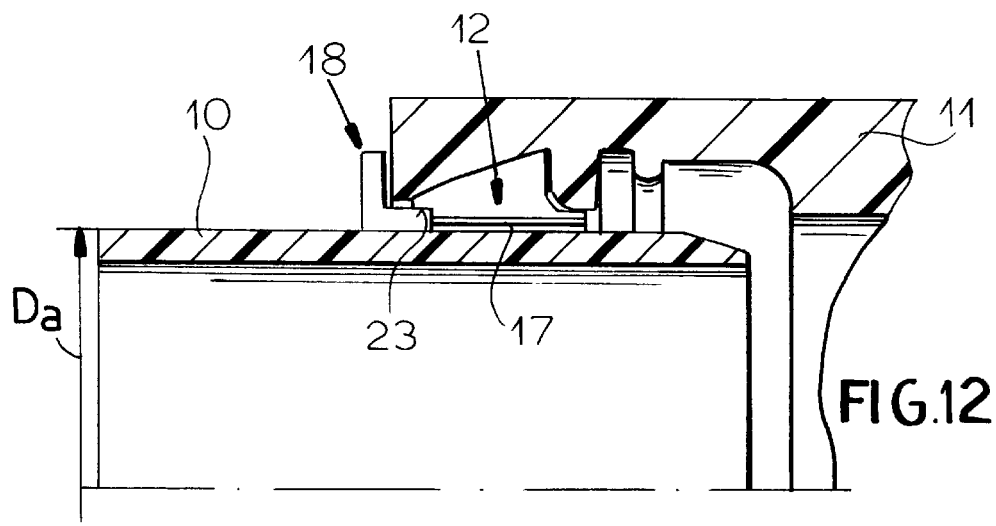

A plier-type tool 26 is insertable through the mouth of the socket 11 into engagement with the surfaces of the split 16 (FIG. 7A), thereby enabling the shoulder 22 to be inserted into the seat 23 (compare FIG. 7) and held to securing ring 12 in its widened state. The shoulder 22 can be slightly conical so that an undercut like indexing of the ring 18 in the ring 12 is possible.

Figure 13:
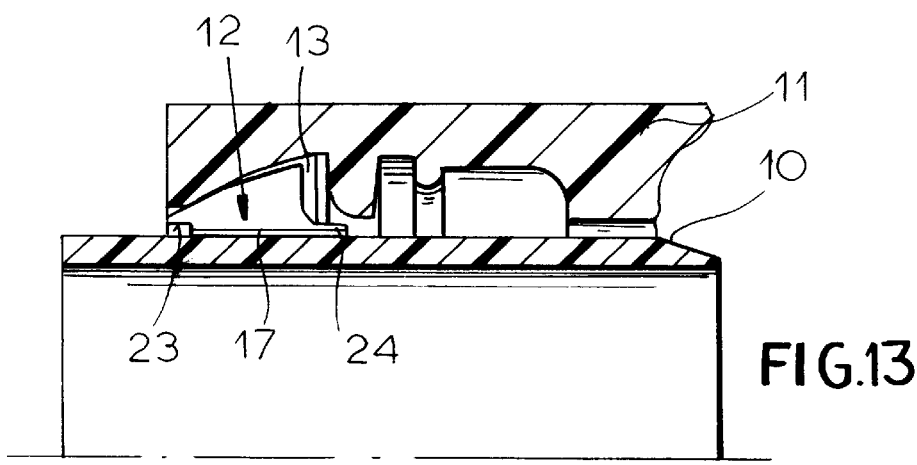

The steps in assembly of the pipe coupling of the invention are illustrated in FIGS. 8–13. Upon insertion of the compressed securing ring 12 in the groove 13 of the socket 11 by reducing the width of the slit 16, the ring 12 is contracted (arrow 27 in FIG. 8) to enable it to be inserted into the groove 13 (FIG. 9). With the tool 26 inserted through the mouth of the socket 11 (FIG. 10) the ring 12 is widened until the ring 18 can be inserted into the seat 23 (FIG. 11), whereupon the tool 26 is withdrawn. At this point, the open diameter $D_i$ is greater than the outer diameter $D_a$ of the pipe segment 10 which can be inserted through the ring 18 and the ring 12 and without any contact with the ring 12 (FIG. 12) until the end position of the pipe section 10 in the socket 11 is reached. The auxiliary mounting ring 18 is then withdrawn axially from the securing ring 12 which springs inwardly against the outer periphery of the pipe section 10 (FIG. 13). The ring 18 is then opened and radially removed from the pipe 10.

Another embodiment of the pipe coupling has been shown in FIGS. 14–18. In this case, the securing ring is subdivided into inner and outer members or, stated equivalently, a securing ring 12 does not directly engage the inner flank 14 of the groove in the socket 11, but rather the groove 13 is lined with an additional auxiliary ring 28 lying against the flank 14. Like the securing ring 12 in this embodiment or the inner ring member, the outer ring member or auxiliary ring 28 is slit and is composed preferably of the same material.

The first step in assembling the pipe coupling is to compress the auxiliary ring 28 to insert it into the groove 13 and allow it to lie along the bed of this groove, i.e. against the flank 14. The outer surface 29 of the ring 28 thus is complementary to and formfitting with the flank 14 of the groove 13. The auxiliary ring 28 has at the mouth end the reduced diameter $d_i$ (FIG. 7) which is at least slightly smaller than the inner diameter of the mouth of the socket so that the latter does not contact the inner member or securing ring 12.

Figure 14:
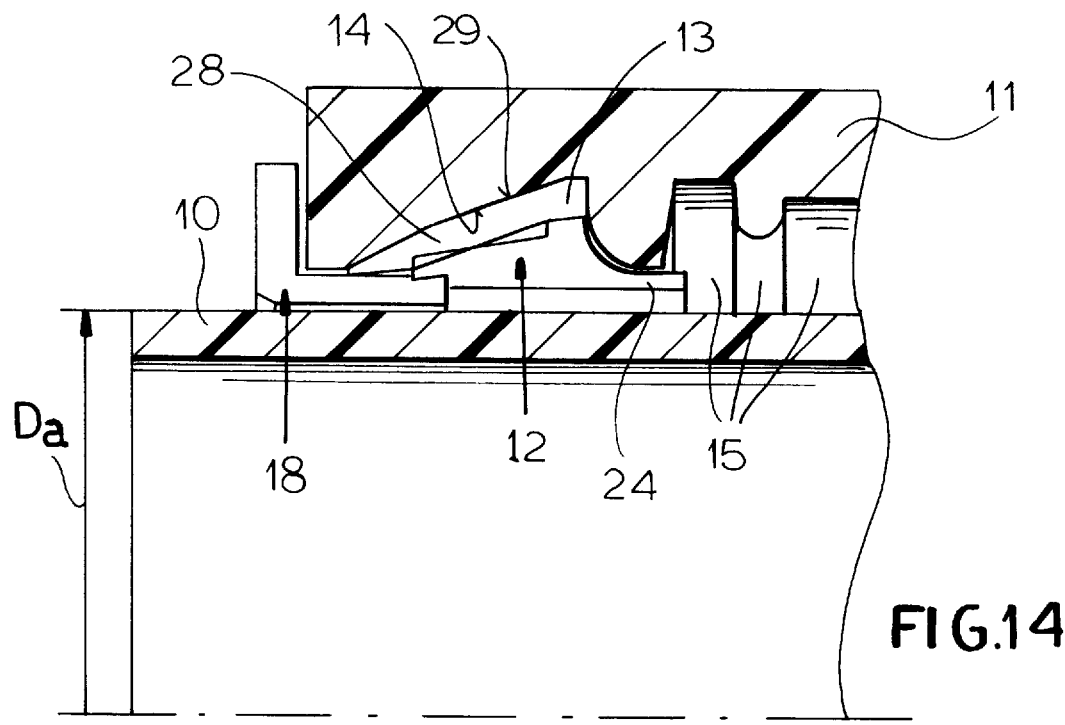
FIG. 14 is a longitudinal section through a pipe connection according to, another embodiment of the invention illustrating the mounting body in place and prior to the final formation of this connection.
Figure 15:
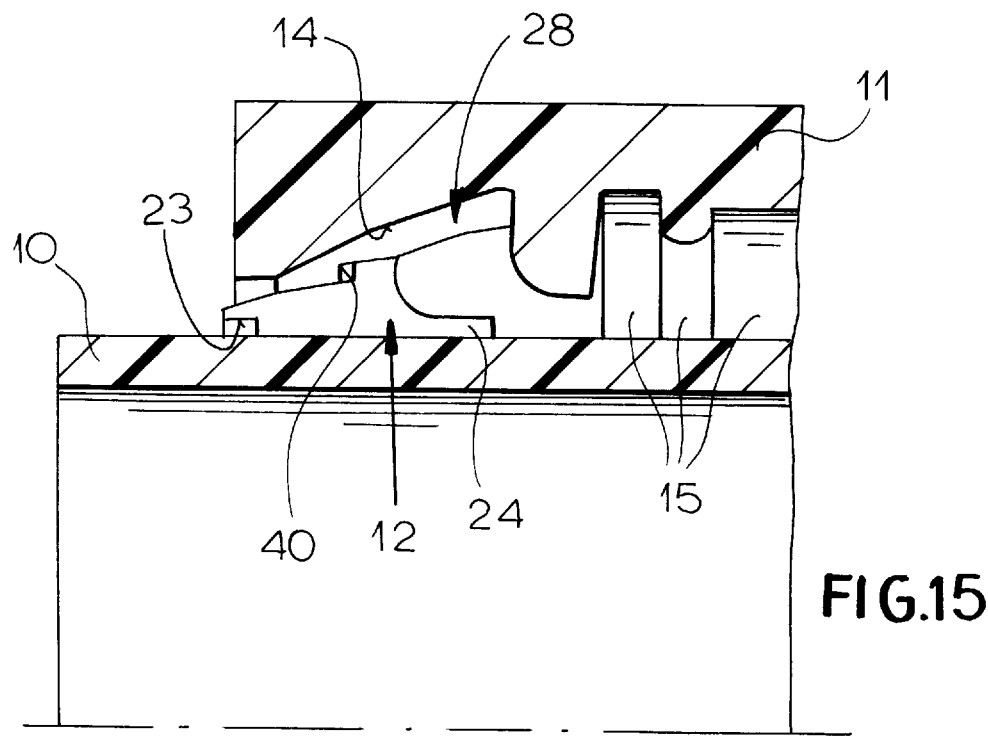
FIG. 15 is an illustration in section of the pipe connection of FIGS. 14 and 14A in the final position.
Figure 14A:
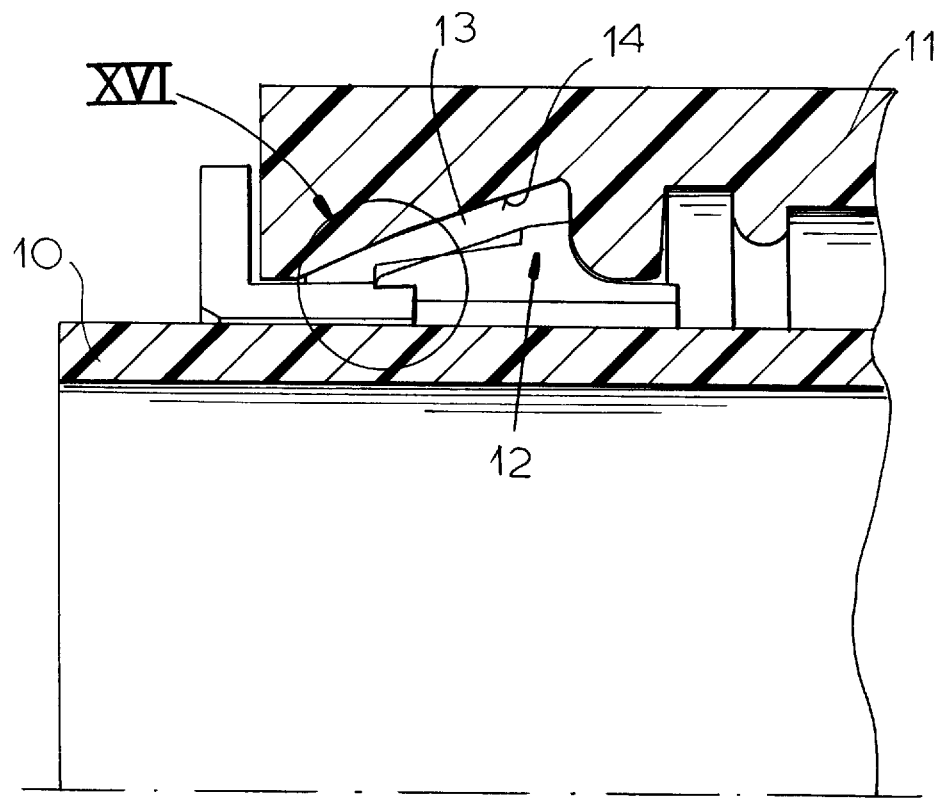
FIG. 14A is a slightly enlarged view illustrating the structure of FIG. 14;'
Figure 16:
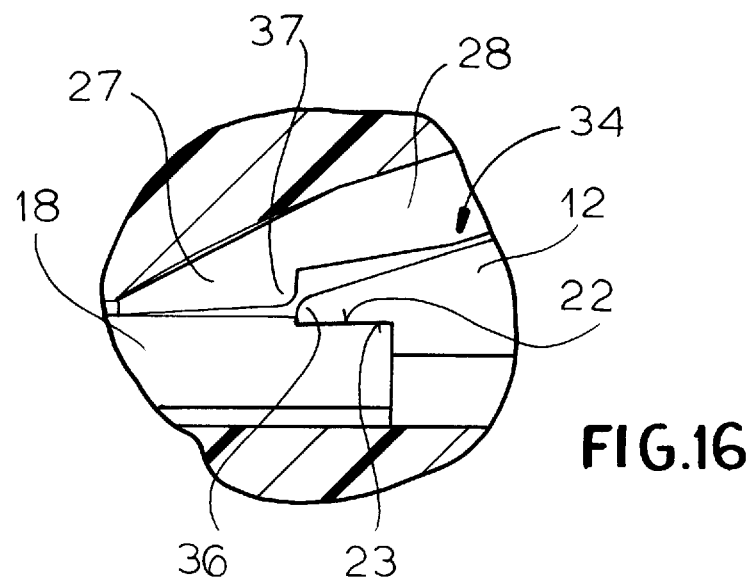
FIG. 16 is a detail of the portion XVI of FIG. 14A.

To insert the slit securing ring 12 in the auxiliary ring 28 already in the groove 13 of the socket 11, the ring 12 is radially compressed, thereby reducing the width of its slit so that it can be inserted in the ring 28 (see FIG. 14). The ring 12 is then expanded in the manner previously described and then auxiliary mounting ring 18 is inserted into it, thereby enabling the insertion of the pipe section 10 through the mounting ring 18 and the expanded ring 12 in such manner that there is no contact between the ring 12 and the outer periphery of the pipe section 10 (FIGS. 14 and 14A).

The member 18 is then removed (FIG. 15) to allow the ring 12 to spring onto the outer periphery of the pipe 10. While in the first embodiment the securing ring 12 directly engages the flank of the groove 13 to wedge the securing ring 12 inwardly, in the present embodiment the base of the groove 13 is lined with the ring 28 whose contact surfaces engaging complementary contact surfaces of the ring 12 create a wedging action.

Figure 17:
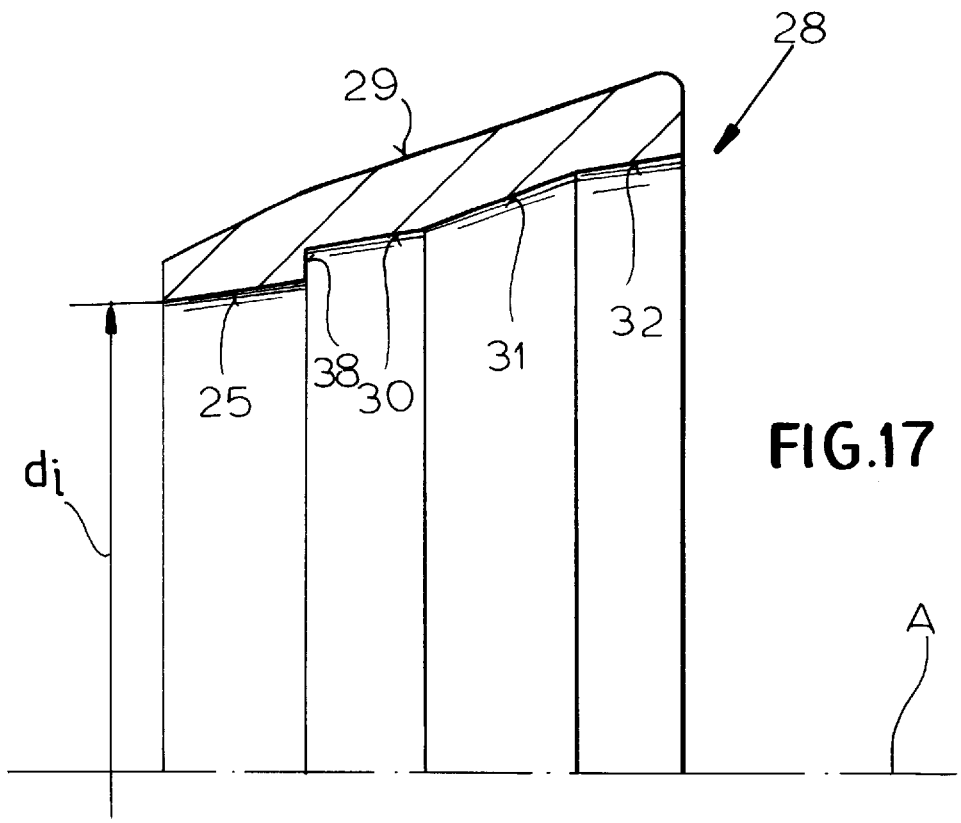
FIG. 17 is an enlarged section of the outer ring member of the pipe connection of FIGS. 14–16.

As can be seen from FIG. 17 especially clearly, the interface between the rings 12 and 28 has a multiplicity of flanks 25, 30, 31 and 32 as seen form the mouth end of the auxiliary ring 28. The angles to the longitudinal axis of the system for these flanks are 10°, 10°, 20° and 10°, respectively.

The flanks which are functionally most important are the flanks 25 and 30 which have inclinations with the axis A which are substantially smaller than the inclination of the surface 14 of groove 13 which is about 20°.

Figure 18:
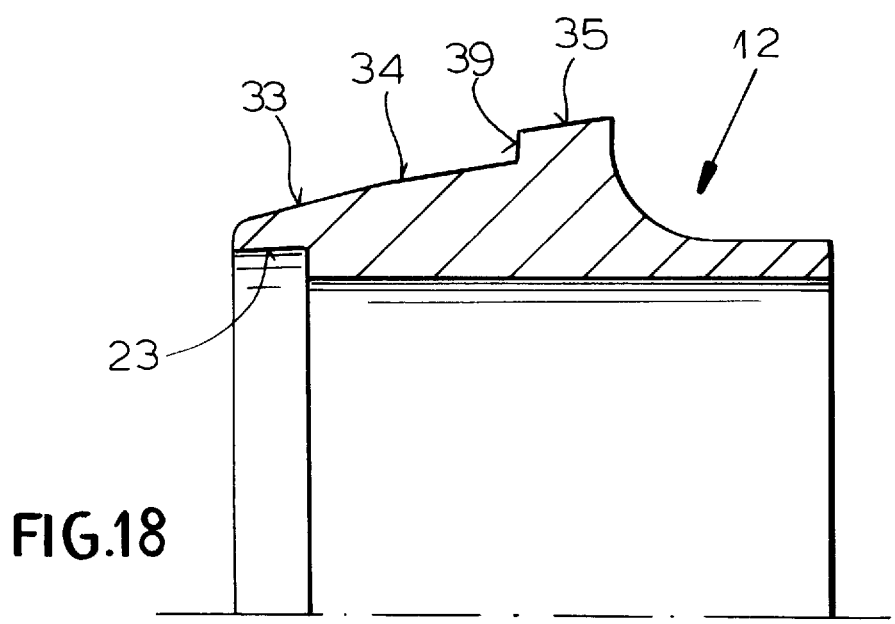
FIG. 18 is an enlarged section of the inner ring member of this pipe conection.
Figure 20:
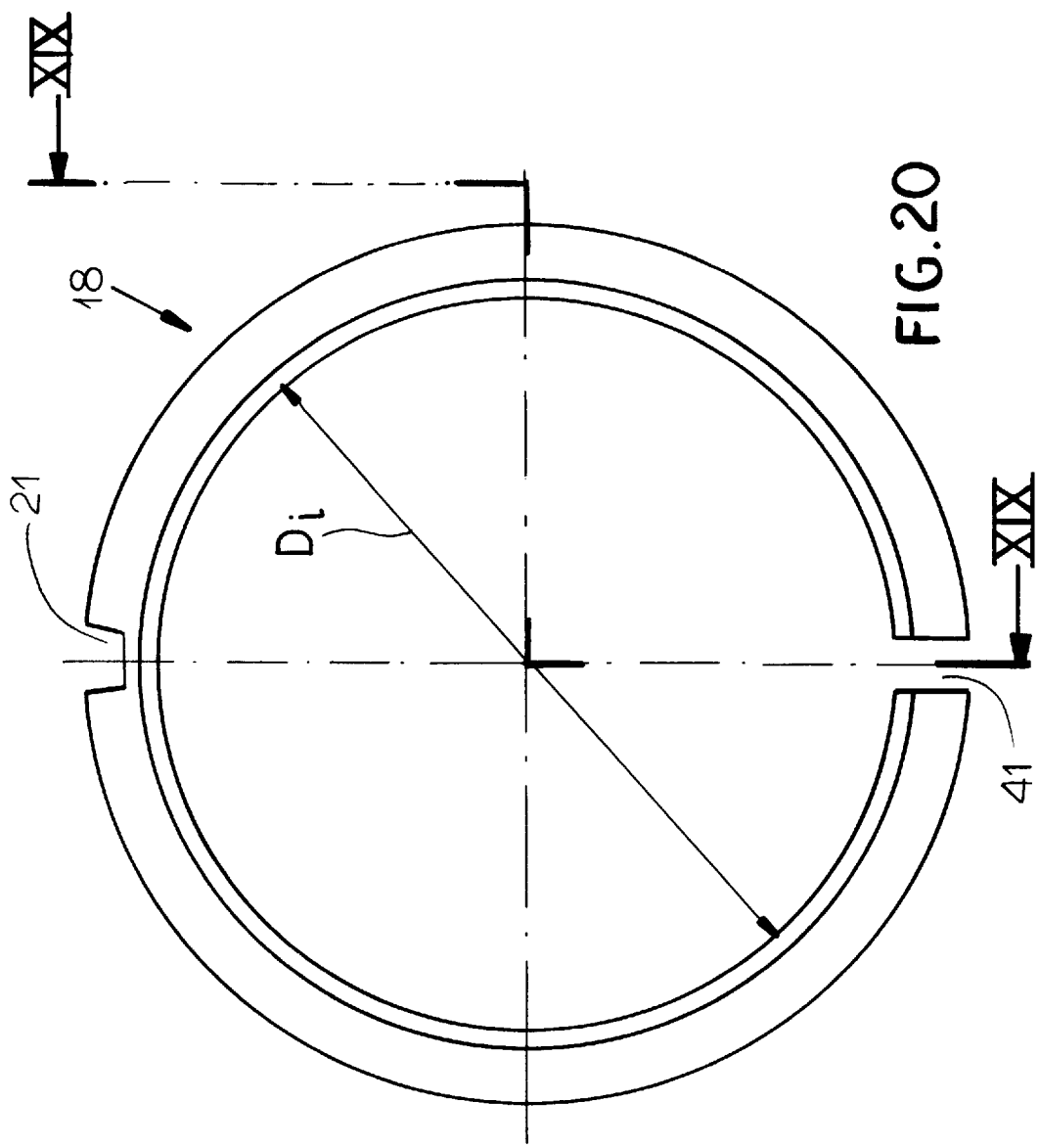
FIG. 20 is an elevational view of the auxiliary mounting ring of FIG. 19.
Figure 19:
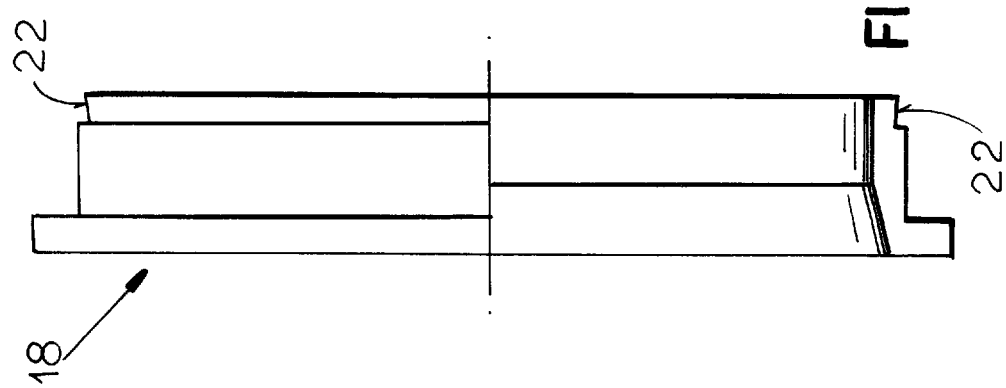
FIG. 19 is a view half in section and half in elevation of an auxiliary mounting ring according to a third embodiment of the invention, the section being taken along the line XIX of FIG. 20.

The outer surface of the securing ring 12 is likewise subdivided into a number of differently inclined flanks represented in FIG. 18 at 33, 34 and 35 which can include angles with the axis A of 16°, 10° and 10°, respectively. In the premounted position of FIG. 14 and the widened securing ring 12, the flank pair 32, 35 are in contact. Simultaneously a line contact is provided as shown at 34 in FIG. 16. The "pointed" end of the ring 12 does not project beyond the stop shoulder 37 of the ring 28. The securing ring engaging the pipe section can now be moved to the right following removal of the auxiliary tool 18.

With such movement, the flank pairs 30, 34, 32, 35 form the force-transmitting contact surfaces between the auxiliary ring 28 and the securing ring 12. These provide axially-spaced contacts at two points for optimum radial force transmission from the socket via the rings to the pipe 10.

While the surface 25 of the auxiliary ring 28 lies forwardly of the flank 30 the surface 35 is lifted by the securing ring 12 relative to the surface 34, in the relative axial displacements of the ring members 12 and 28. Thereafter there is a more complete overlap of the two members with two relatively shallow inclined flanks of each of the rings in engagement with one another and the abutment surface 38 dropping behind the ring 12 to prevent separation. The geometry is such that under normal operating conditions, a gap 40 remains between the confronting surfaces 38 and 39 of the projecting shoulders of the two rings which abut with one another and thus the relative movement of the two rings is possible to increase the clamping effect of the ring 12 upon the tube 10 upon the application of axial tension to the coupling.

FIGS. 19–26 show yet another embodiment of the invention in which the securing ring is constituted of two ring members, i.e. an auxiliary ring 28 is received in the groove and is engaged by the securing ring 12. In this case, however, no separate tool is required to spread the auxiliary ring 12. Rather, as is seen from FIGS. 23–25, when the auxiliary mounting ring 18 is inserted in the securing ring 12 it can act as the spreading tool, being spread in turn by the insertion of the pipe 10 therein.

The auxiliary mounting ring 18 (FIGS. 19 and 20) is itself a split ring with a slit 41 along its periphery and, capable of being contracted to engage in the seat 23 of ring 12. Opposite the split 41 is a weakened zone 21 which subdivides the ring 18 into two ring halves which can be clamped around the pipe 10 or, when the ring 18 is removed, can be spread to enable the ring to be removed radially from the pipe. It can be advantageous to provide a multiplicity of such weakened zones 21 about the circumference of the ring 18 to provide the ring with a less elliptical and more circular contour upon the shape change of the ring.

Figure 21:
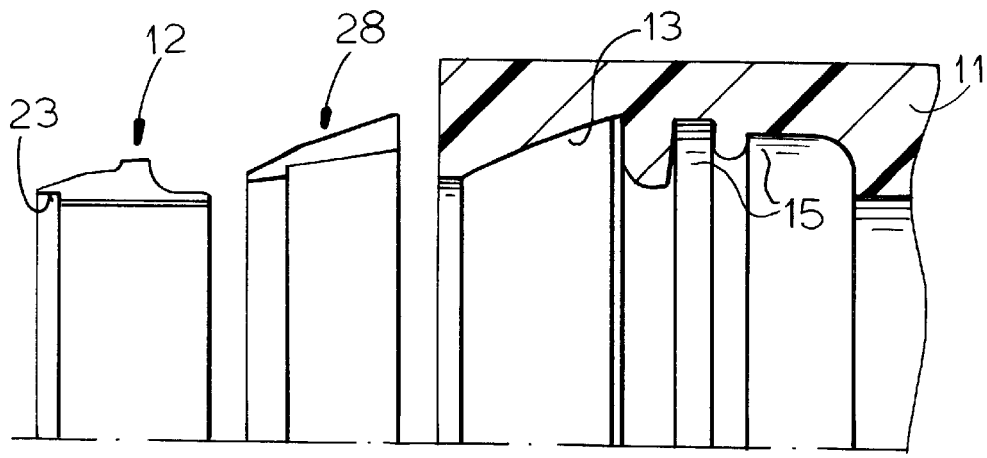
FIGS. 21–23 are sectional views illustrating successive steps in the assembly of the third embodiment of the pipe connection of the invention.
Figure 22:
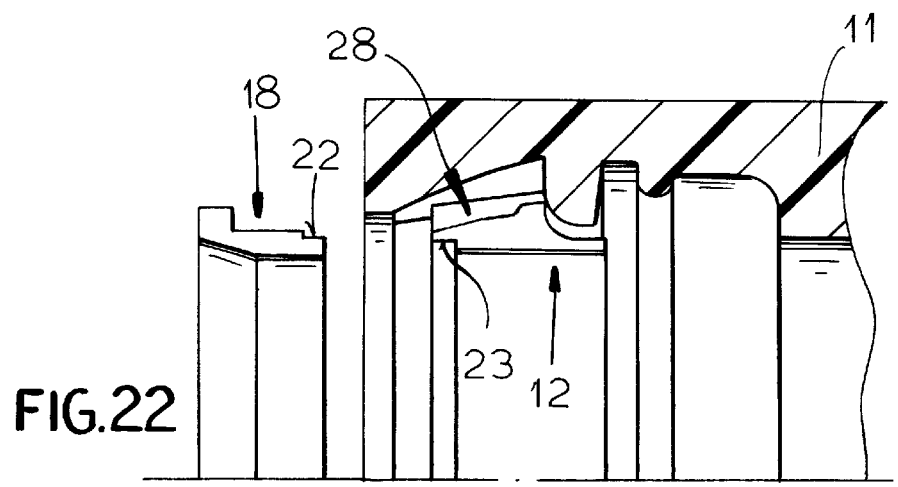
Figure 23:
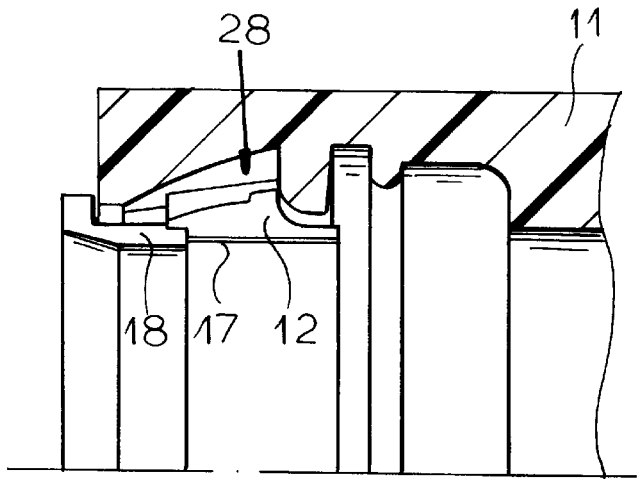

Once the ring 28 is inserted and the ring 12 then placed therein in the manner previously described and as indicated in FIG. 21, the auxiliary mounting ring 18 is contracted and fitted into the seat 23 to provide a formfitting connection therewith. There is no noticeable expansion of the securing ring 12 in this operation (see FIGS. 23 and 24).

Figure 24:
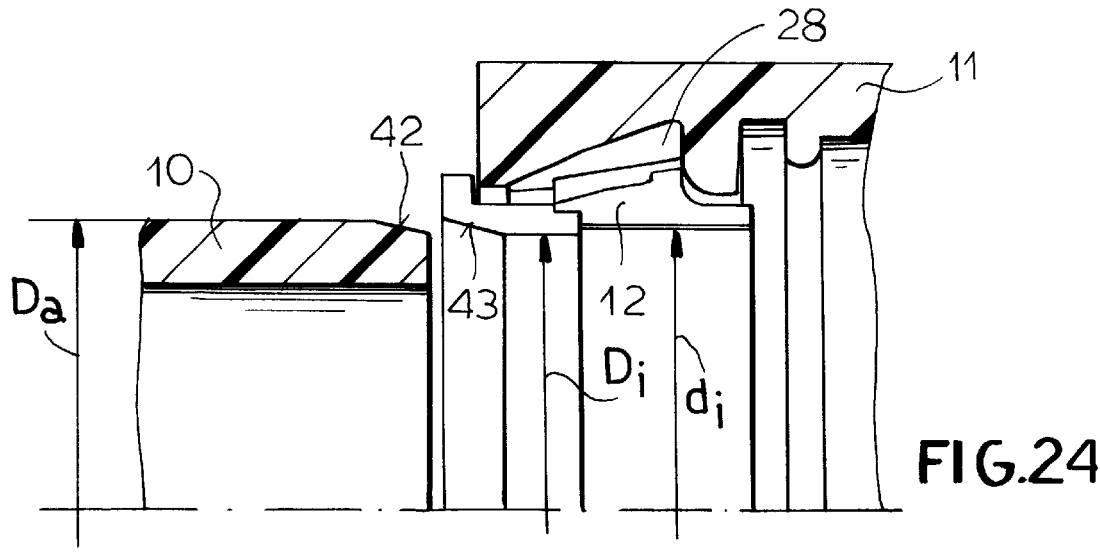
FIG. 24–26 are sectional views illustrating the steps in insertion of the tube segment and the final assembled view of this pipe connection.
Figure 25:
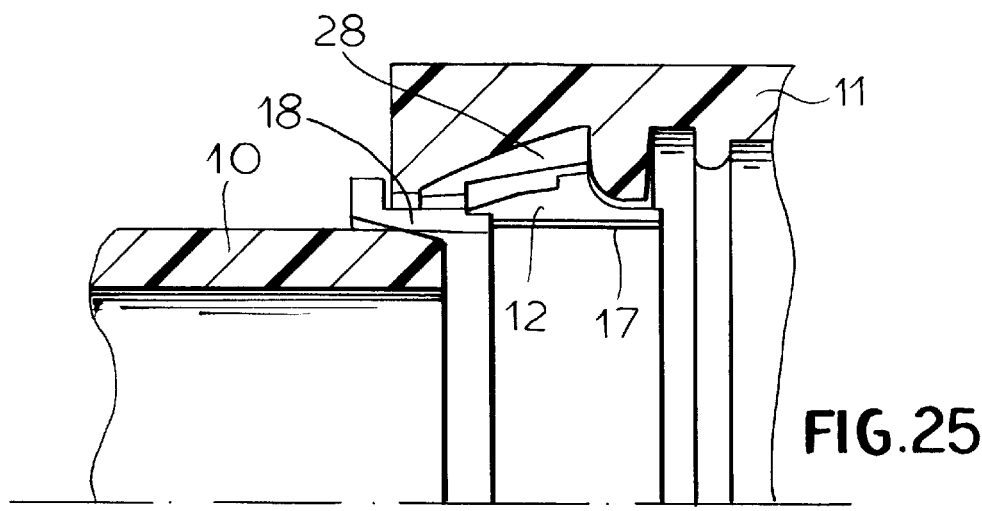

As is especially apparent from FIG. 24, in this position the auxiliary mounting ring 18 has an inner diameter $D_i$ which is slightly smaller than the outer diameter $D_a$ of the pipe segment 10 and is also smaller than the inner diameter $d_i$ of the securing ring 12.

The pipe 10 and the ring 18 have their confronting edges beveled at 42 and 43 so that the frustoconical bevel at the leading end of the pipe (at 42) of the part of the ring 18 turned toward the pipe. As the pipe 10 is inserted into the auxiliary mounting ring 18, the latter is widened until the outer surface of the tube 10 and the inner cylindrical surface of the auxiliary ring engage each other. This position has been shown in FIG. 26 and the intermediate position will be apparent from FIG. 25. This does not normally present a problem since the frictional contact of ring 18, which is also composed of plastic, would not normally damage the pipe

Figure 26:
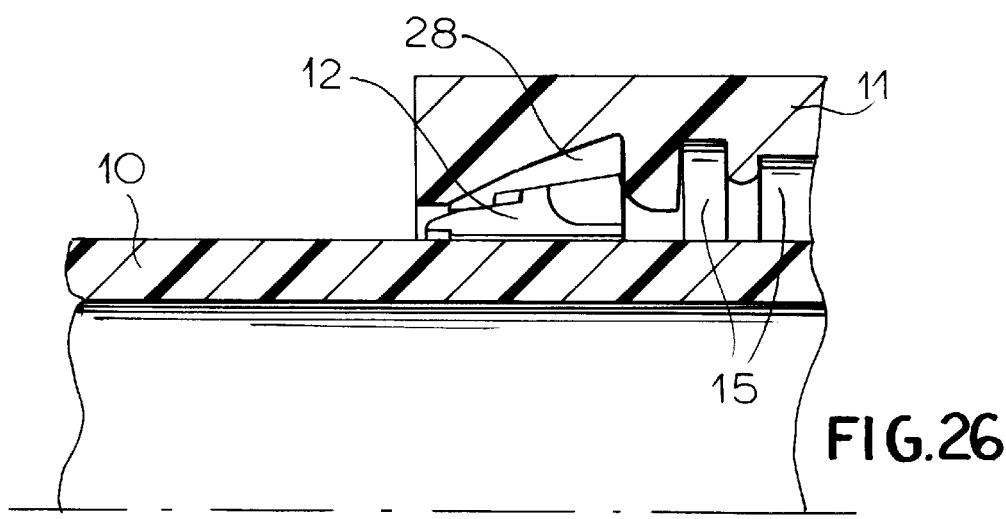

10. It is not provided with the friction-increasing coating 17 of corundum or the like. Continued displacement of the pipe 10 to its final position and withdrawal of the ring 18 results in the ultimate connection of the coupling as shown in FIG. 26.

We claim:

1. A tension-resisting pipe connection kit comprising:

a pipe section of a first material;

a peripherally split securing ring surrounding said pipe section and frictionally engageable with an outer periphery thereof; and a socket of a second material stiffer than said first material, said socket having a mouth receiving pipe section and formed with an inwardly open groove accommodating said securing ring, at least one of said groove and said ring having a generally conical flank converging toward said mouth of said socket and wedging said ring toward said pipe section upon application of tension to the pipe connection tending to draw said pipe section out of said socket, said ring being dimensioned to have an intrinsic elastic force bearing inwardly so that a force with which said ring bears upon said pipe section is determined by said intrinsic elastic force and a compressive force determined by said tension, said ring being formed with engagement surfaces engageable by a spreading tool insertable through said mouth of said socket for spreading said ring into said groove, and said ring having a seat engageable with a removable mounting body on a side turned toward said mouth for holding said ring in a spread condition enabling contactless insertion of said pipe section therethrough, said securing ring is formed with an axial extension projecting away from said mouth along said pipe segment axially beyond said groove.

2. The pipe connection kit defined in claim 1 wherein said body is an auxiliary mounting ring having a slit along a circumference of said auxiliary mounting ring subdividing said auxiliary mounting ring into two mutually spreadable ring segments, and at least one hinge joint connecting said segments together.

3. The pipe connection kit defined in claim 2 wherein said auxiliary mounting ring is formed in one piece and said hinge joint is a weakened zone in said one piece.

4. The pipe connection kit defined in claim 1 wherein at least one of said rings is composed of a tough elastic synthetic resin in the form of a polyamide.

5. The pipe connection kit defined in claim 1 wherein said mounting body is a spreadable auxiliary mounting ring formfitting into said securing ring and having an inner diameter ($D_1$) greater than an outer diameter ($D_a$) of said pipe segment.

6. The pipe connection kit defined in claim 5 wherein said securing ring has a turned annular shoulder forming said seat and centering said auxiliary mounting ring on said securing ring.

7. The pipe connection kit defined in claim 6, further comprising means for indexing said auxiliary mounting ring to said seat.

8. A tension-resisting pipe connection kit comprising:

a pipe section of a first material;

a peripherally split securing ring surrounding said pipe section; and a socket of a second material stiffer than said first material, said socket having a mouth receiving said pipe section and formed with an inwardly open groove accommodating said securing ring, at least one of said groove and said ring having a generally conical flank converging toward said mouth of said socket and wedging said ring toward said pipe section upon application of tension to the pipe connection tending to draw said pipe section out of said socket, said ring being dimensioned to have an intrinsic elastic force bearing inwardly so that a force with which said ring bears upon said pipe section is determined by said intrinsic elastic force and a compressive force determined by said tension, said ring being formed with engagement surfaces engageable by a spreading tool insertable through said mouth of said socket for spreading said ring into said groove, and said ring having a seat engageable with a removable mounting body on a side turned toward said mouth for holding said ring in a spread condition enabling contactless insertion of said pipe section therethrough, said securing ring comprising an outer ring member and an inner ring member received in said outer ring member, said outer ring member being axially braced in said socket and having an outer periphery complementary to a generally conical base of said groove and forming said generally conical flank, said inner ring frictionally engageable with an outer periphery of said pipe section, said inner and outer ring members having mutually engaging flanks of lesser inclinations to said pipe segment than said conical base, said flanks being axially slidable relative to one another.

9. The pipe connection kit defined in claim 8 wherein said outer ring member is split and is held by said mounting body against said base for insertion of said pipe segment in said securing ring.

10. The pipe connection kit defined in claim 9 wherein said inner ring member and said outer ring member complementarily fit together at said flanks to resist axial telescoping of said ring members relative to one another upon application of said tension.

11. The pipe connection kit defined in claim 10 wherein said flanks include mutually engaging shoulders on said ring members close to ends thereof proximal to said mouth of said socket.

12. The pipe connection kit defined in claim 10 wherein said flanks include two axially spaced inclined flanks of said ring members applying axially spaced inwardly directing forces to said pipe segment upon application of said tension to the pipe connection.

13. A tension-resisting pipe connection kit comprising:

a pipe section of a first material;

a peripherally split securing ring surrounding said pipe section and frictionally engageable with an outer periphery thereof; and a socket of a second material stiffer than said material, said socket having a mouth receiving said pipe section and formed with an inwardly open groove accommodating said securing ring, at least one of said groove and said ring having a generally conical flank converging toward said mouth of said socket and wedging said ring toward said pipe section upon application of tension to the pipe connection tending to draw said pipe section out of said socket, said ring being dimensioned to have an intrinsic elastic force bearing inwardly so that a force with which said ring bears upon said pipe section is determined by said intrinsic elastic force and a compressive force determined by said tension, said ring being formed with engagement surfaces engageable by a spreading tool insertable through said mouth of said socket for spreading said ring into said groove, and said ring having a seat engageable with a removable mounting body on a side turned toward said mouth for holding said ring in a spread condition enabling contactless insertion of said pipe section therethrough, said mounting body forming said tool and being a peripherally slit spreader ring with an inner diameter upon connection to said securing ring which is smaller than an outer diameter ($D_a$) of the pipe segment and smaller than an inner diameter of the securing ring whereby insertion of said pipe segment in said mounting body expands said mounting body and said securing ring to pass said pipe segment into said securing ring without contact therewith.

14. The pipe connection kit defined in claim 13 wherein an end of said pipe segment inserted into said mounting body and an end of said mounting body facing away from said mouth are beveled to form self-centering ramps.

15. A method of making a tension-resisting pipe connection, said method comprising the steps of:
(a) providing a socket of a first material having a mouth receiving said pipe section and formed with an inwardly open groove;
(b) positioning a peripherally split securing ring in said groove, at least one of said groove and said ring having a generally conical flank converging toward said mouth of said socket for wedging said ring inwardly upon application of tension to the pipe connection;
(c) spreading said securing ring with a tool inserted through said mouth to increase a diameter of said securing ring and lodge said ring against said socket in an expanded position of said securing ring;
(d) holding said securing ring in said expanded position with an auxiliary mounting ring and removing said tool;

(e) inserting a pipe segment of a second material softer than said first material into said mounting ring and contactlessly through said securing ring to a given position in said socket; and (f) removing said auxiliary mounting ring from said securing ring and from said pipe segment, thereby enabling said securing ring to frictionally close onto said pipe segment.

16. The method defined in claim 15, further comprising the step of compressing an outer ring member and inserting it into said groove through said mouth before expanding an inner ring member forming said securing ring therein.

17. A method of making a tension-resisting pipe connection, said method comprising the steps of:
(a) providing a socket of a first material having a mouth receiving said pipe section and formed with an inwardly open groove;
(b) positioning a peripherally split securing ring in said groove, at least one of said groove and said ring having a generally conical flank converging toward said mouth of said socket for wedging said ring inwardly upon application of tension to the pipe connection;
(c) inserting a spreading body into said securing ring and spreading said body to increase a diameter of said securing ring and lodge said ring against said socket in an expanded position of said securing ring;
(d) while holding said securing ring in said expanded position with said body, inserting a pipe segment of a second material softer than said first material into said body and contactlessly through said body to a given position in said socket;
(e) removing said body from said securing ring and from said pipe segment, thereby enabling said securing ring to frictionally close onto said pipe segment; and
(f) compressing an outer ring member and inserting it into said groove through said mouth before expanding an inner ring member forming said securing ring therein.

* * * * *